ADR GROUP DEC

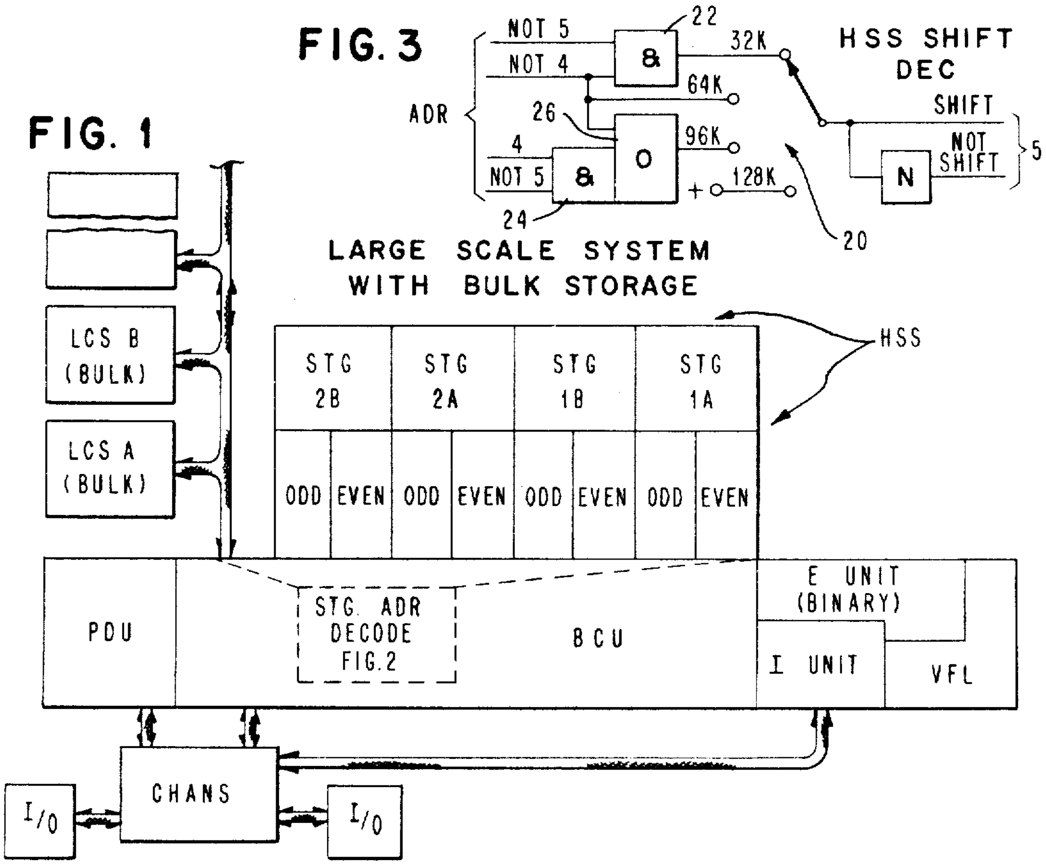
FIG. 1, FIG. 3
FIG. 2 STG ADR DECODE
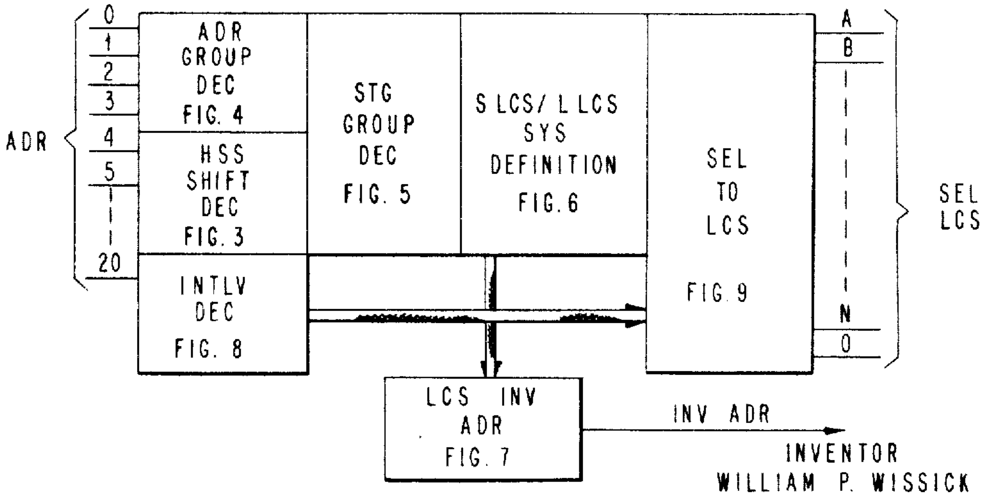
INVENTOR
WILLIAM P. WISSICK
BY Melvin P. Williams
ATTORNEY

STG GROUP DEC

SLCS/LLCS SYS DEFINITION

LCS INV ADR

INTLV DEC

FIG. 11
| NOMINAL | ACTUAL |
|---|---|
| 32K | 32,768 |
| 64K | 65,536 |
| 96K | 103,304 |
| 128K | 131,072 |
| 256K | 262,144 |
| 512K | 524,288 |
| 1024K | 1,048,576 |
| 2048K | 2,097,152 |
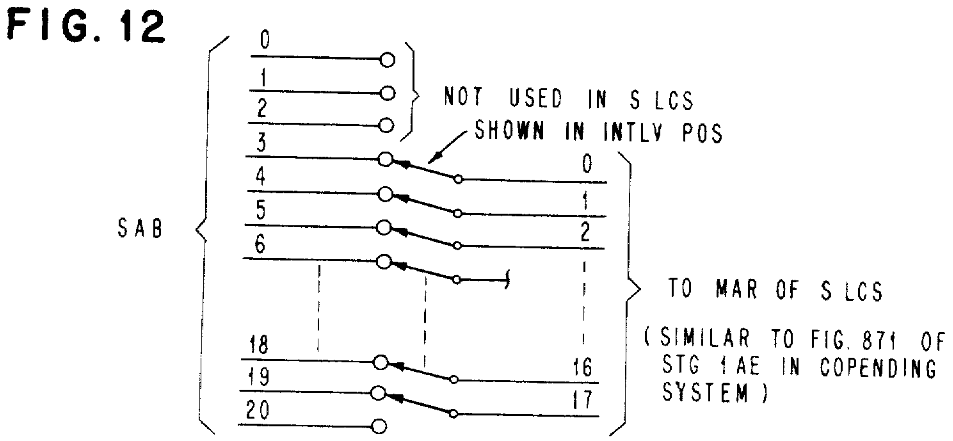
FIG. 12
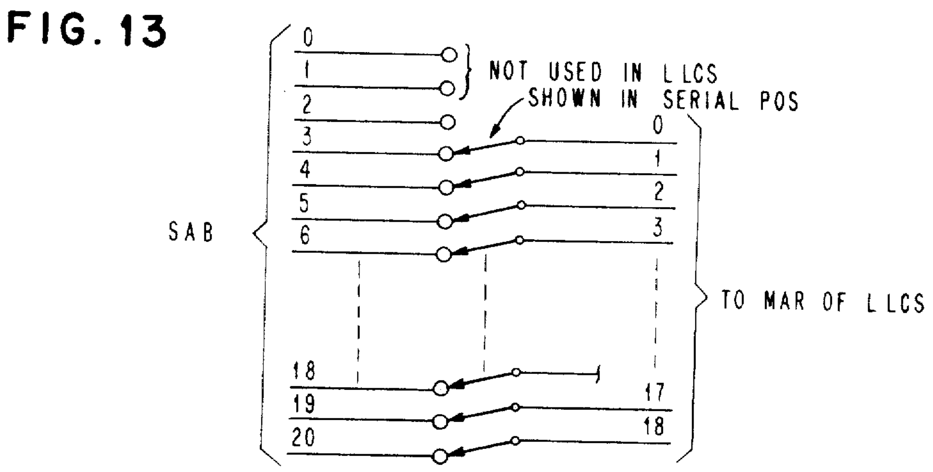
FIG. 13

United States Patent Office 3,435,420
Patented Mar. 25, 1969

3,435,420

CONTIGUOUS BULK STORAGE ADDRESSING

William P. Wissick, Ferncliff, Rhinebeck, N.Y., assignor to International Business Machines Corporation, Armonk, N.Y., a corporation of New York Filed Jan. 3, 1966, Ser. No. 518,149
Int. Cl. G11b 13/00
U.S. Cl. 340—172.5 12 Claims

ABSTRACT OF THE DISCLOSURE

Disclosed, in the environment of one or more data processing systems, is an apparatus for contiguously addressing bulk stores and working or primary stores where the bulk stores are characterized as large but relatively slow speed and the working stores are characterized as small but relatively high speed. Contiguous addressing is achieved by providing address wrap-around on a storage unit basis. Each bulk store is addressed so that its higher-ordered storage locations are accessed with an address which is shifted by an amount equal to the address field size of the working store. Addresses exceeding those in the highest-ordered storage locations within a bulk store are utilized to reach the storage locations at the lower-ordered end of that bulk store. Addresses in excess of those used to reach the lowest-ordered location of the first bulk store are utilized to reach the higher-ordered end of a next bulk store, and so on. Addressing is thereby contiguous and is transposed on a wrap-around fashion on a store-by-store basis.

This invention relates to data processing, and more particularly to apparatus for contiguously addressing bulk storage devices (large, slow) contiguously with main working storage devices (smaller, higher-speed) within a data processing system.

In data processing, the use of high-speed working storage (that provided by devices such as toroidal magnetic cores) together with bulk storage has long been known. However, bulk storage found in the prior art is generally that of an electromechanical type such as discs, drums, tapes, or record card handling equipment. These devices are not accessible as part of the internal storage of a central processing unit in a data processing system, but rather are accessed by means of special commands with particular designations which are different from the address designations utilized to reach main storage.

Recent advancements in the data processing art, and the general growth in complexity and sophistication of applications for data processing have resulted in the need for larger and larger main storage which is reachable directly by the programmer by means of main storage addresses; it is well known, however, that the cost of a high-speed storage device increases more than proportionately with the size thereof, and that the speed of such devices decreases as size is increased. This has caused a trend toward having storage devices of two different types, both accessible by the programmer by means of the regular main storage addresses. A system of this type is illustrated briefly in copending applications of the same assignee, "Memory Bus Control Unit," Ser. No. 79,591, filed on Dec. 30, 1960, by R. Blosk et al., now U.S. Patent 3,231,862, and "Memory Bus Control Unit," Ser. No. 79,899, filed on Dec. 30, 1960, by Lars O. Ulfsparre, now U.S. Patent 3,231,863. The type of addressing heretofore provided in a system of the type described in said copending applications, provides contiguous addressing by utilizing addresses at the low-ordered end of the addressing scale to specify locations within the smaller, high-speed storages, and utilizing addresses higher than those in high-speed storage, to address successive high-ordered portions of a sequence of large, slower storage devices; the very highest-ordered addresses were used to reach the lowest-ordered portion of the lowest-ordered bulk storage device. In other words, addresses within the large, slow storage begin where they leave off in the smaller, high-speed storage, and proceed to the maximum capacity of the aggregate of all the large, slow storage devices; thus, the addresses which correspond to the low-ordered locations within the large, slow store are actually used to reach the high-speed store, and addresses above those which represent the maximum capacity of the large, slow store are utilized to reach the lowest-ordered locations in the large store, in an offset, wrap-around fashion. In other words, the very lowest addresses are used to reach the high-speed store and the very highest addresses are transposed to reach those locations in the large store which would be reached by low addresses if the high-speed store were not contiguously addressed together with the large store.

This system of contiguously addressing known in the prior art is characterized by the fact that wrap-around from the highest-ordered storage location to the lowest-ordered storage location in the large storage device is accomplished on a gross basis; that is, all of the large storage units which are utilized in a system are addressed as a single block, addresses commencing at some mediate point which equals the amount of high-speed storage, and progressing sequentially until the highest-ordered storage location of the highest-ordered bulk storage device is reached, with a wrap-around then occurring to the lowest-ordered storage location of the lowest-ordered bulk storage device. Although this is suitable for a single installation within a unitary system, the foregoing addressing capability cannot be used in a shared system unless both systems have identical addressing capability and share identical storage devices. Furthermore, the foregoing addressing means is difficult to modify for various configurations of high speed and slow speed storage devices.

Wherefore, the primary object of the present invention in to provide a more versatile contiguous bulk storage addressing capability.

Another object is to provide for contiguous addressing between high-speed and bulk storage devices which is readily adaptable to different configurations of fast and slow storage within a given system.

A further object is to provide a contiguous bulk storage addressing scheme capable of utilization in an environment of shared data processing systems characterized by lack of identity between the systems involved.

This invention is predicated on the achievement of contiguous addressing by providing wrap-around on a box, or storage unit basis, rather than on a gross basis involving all of the storage units in the system.

In accordance with the present invention, each bulk storage device is addressed in such a fashion that the higher-ordered storage positions of the device, in general, are accessed with addresses commencing with those just above the addresses utilized for high-speed storage, and addresses which exceed those relating to the highest-ordered storage location within the large storage device are utilized to reach the storage locations at the low-ordered end of that storage device; addresses in excess of those used to reach the low-order end of a first large storage device are utilized to reach the high-order end of the next large storage device, etc., so that accessing is transposed in a wrap-around fashion on a device-by-device basis.

By the arrangements described hereinbefore, it is possible to provide one or more units of storage, together with one or more gaps, each gap being equal in the number of addresses spanned thereby, to one of the bulk storage units. As the result of the capability of having gaps, it is possible for two systems to share some storage devices but not others, the ones being not accessible to a particular system representing gaps to that system. Additionally, a second system can be made to share a single storage of an established system even though programs have already been written using very high addresses, the addresses being in excess of the amount of storage to be provided for the second system, by utilizing the gaps, and the invalid address recognition resulting therefrom, as a means of confining the second system to its own permissible areas of storage, shared and unshared. The invention facilitates changing the storage arrangements with respect to a particular system, with or without sharing by another system.

The foregoing and other objects, features and advantages of the present invention will become more apparent in the light of the following detailed description of a preferred embodiment thereof, as shown in the accompanying drawings.

In the drawings:

FIG. 1 is a simplified schematic block diagram of a large scale data processing system, illustrating the utilization of high speed and bulk storage, FIG. 2 is a simplified schematic block diagram of a storage address decoder for use in a system illustrated in FIG. 1, in accordance with an illustrative embodiment of the present invention;

FIG. 3 is a schematic block diagram of a high-speed shift decoder of the type useful in the storage address decoder embodiment of FIG. 2;

FIG. 11 is a chart indicating the relationship between nominal and actual addresses and storage capacities, in accordance with the present invention.

FIG. 12 is a simplified schematic block diagram of circuitry for connecting external addresses for use as internal addresses in a small-sized, large capacity storage.

FIG. 13 is a simplified schematic diagram of circuitry used for connecting external addresses as internal addresses in a large-sized, large capacity storage.

Referring now to FIG. 1, the principles of the present invention are shown in an embodiment which is implemented within an environmental system, the basic characteristics of which are disclosed in a copending application of the same assignee entitled, "Large Scale Data Processing System," filed on Apr. 5, 1965 by Olin L. MacSorley et al., Ser. No. 445,326. Said system is shown herein modified by the provision of more or less high-speed storage devices (1*a*, 1*b*, 2*a*, 2*b*) together with the addition of one or more large capacity (bulk) storage devices (LCS A, LCS B). The illustration within FIG. 1 comprises four high-speed storage devices and at least two large capacity storage devices (hereinafter referred to as LCS). The addresses which will relate to the bulk storage devices are dependent upon the amount of high-speed storage provided on a system. Thus, LCS A will be reached by lower addresses if only a single high-speed storage device (STG 1A) is provided than would be the case if four different high-speed storage devices (STG 1A, STG 1B, STG2A, STG 2 B) were provided. The concepts of the problem of contiguous addressing, and of the solution afforded by the present invention are described with respect to FIG. 10.

Figure 10:
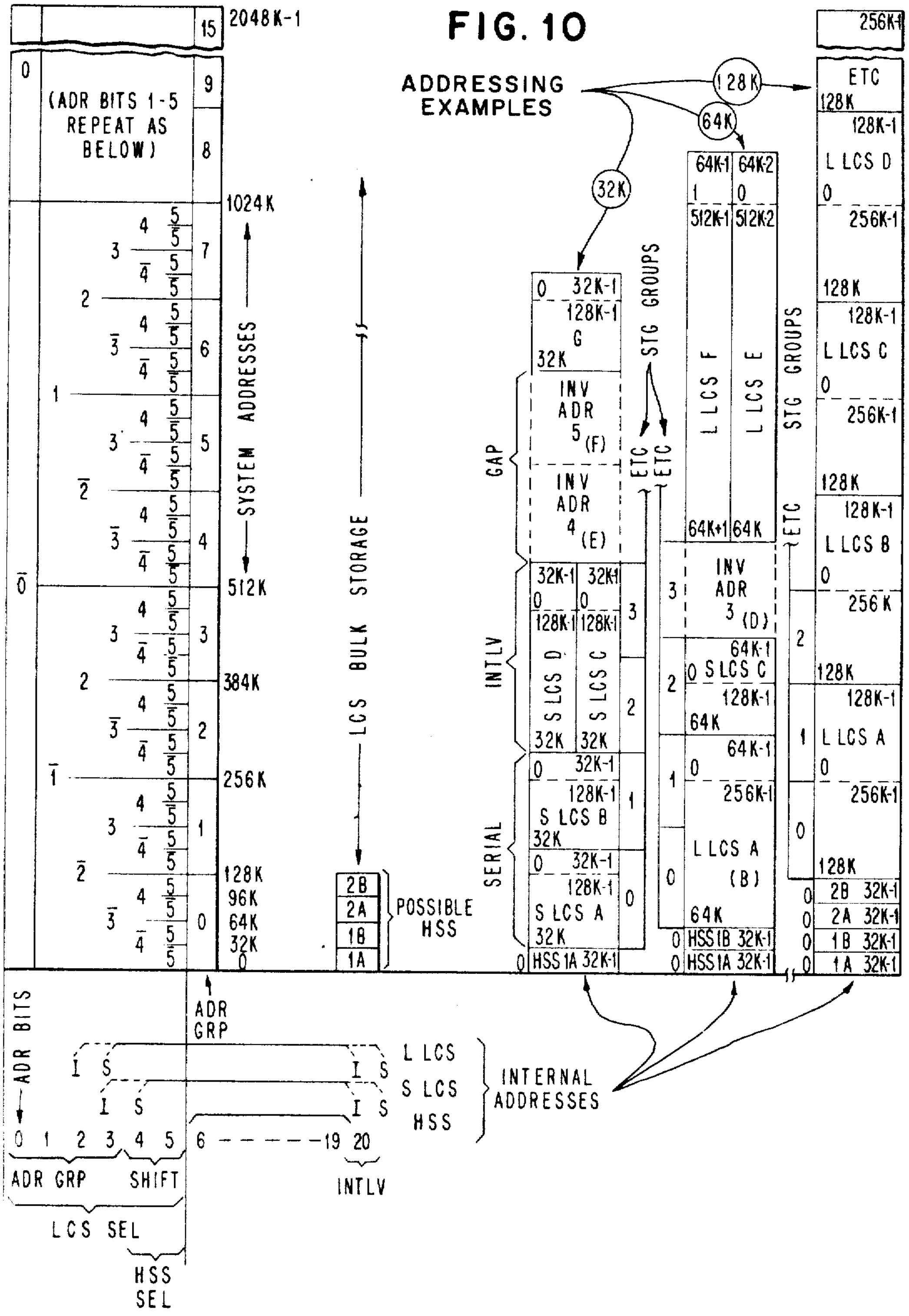
FIG. 10 is a chart illustrating addressing in accordance with the present invention.

The addresses referred to in FIG. 10 have been rounded off for convenience and simplicity, but it should be understood by those skilled in the art that the number of storage locations referred to, and therefore the addresses of particular locations, will be those which are inherent in binary addressing. As an example of the relationship between the simplified, rounded-off addresses referred to in FIG. 10 and elsewhere herein, the chart of FIG. 11 illustrates the relationship between actual addresses and thereto. Note that "K" as used herein indicates "thousands." Each storage location in the present embodiment includes 64 data bits and 8 related parity bits, as described herein.

The left-hand side of FIG. 10 illustrates a spectrum of system addresses, and the address bits utilized to reach various points within the spectrum. The right-hand half of FIG. 10 contains three different illustrative storage configurations, which are offered only by way of example for purposes of explanation, it being apparent to those skilled in the art that a variety of configurations may be implemented in accordance with the principles of the present invention. In the lower center of FIG. 10 is illustrated the amount of storage which might be provided in high-speed storage (HSS) within a system. Thus, if only storage unit 1A were provided, it would contain addresses 0 through 32K; storage 1B would include addresses between 32K and 64K, storage 2A would contain addresses between 64K and 96K, and storage 2B would include addresses between 96K and 128K. The bulk storage, herein referred to as large capacity storage (LCS) would have addresses in excess of the possible high-speed storage. Examples are shown on the right of FIG. 10 for configurations including one unit of high-speed storage, two units of high-speed storage, and four units of high-speed storage; similar reasoning applies to a configuration including three units of high-speed storage, which has been eliminated herefrom for the purpose of simplicity. The present invention is described, by way of example, with respect to two different sizes of LCS: S LCS (small-sized large capacity storage) includes 128K storage locations; L LCS (large-sized large capacity storage) includes 256K storage locations. The particular configuration illustrated in the addressing example for 32K HSS (approximate center of FIG. 10) includes a single HSS (storage 1A) which contains storage locations 0 through 32K–1. This configuration then includes various combinations of S LCS, the first two being serial, followed by a pair which are connected in odd/even interleaved fashion, followed by a gap equal to two more units, followed by a single unit. The configuration illustrated with respect to the 64K addressing example includes two high-speed storage units (1A, 1B) followed by, first, one L LCS, one S LCS, a gap equal to one S LCS, and two L LCS units connected in odd/even interleaved fashion. The 128K addressing example at the extreme right of FIG. 10 illustrates four high-speed storage units (1A–2B) each of which contains an internal address of 0 through 32K–1, the external addresses of which are 0 through 128K–1, followed by eight L LCS units (some of which are broken away for simplicity) each of which has internal addresses of 128K to 256K–1 followed by internal addresses of 0 to 128K–1, all of which are connected in a simple serial fashion.

The concepts of addressing involved where odd/even interleaving is available, as well as in selecting among serially-disposed different storage units, each of which utilize identical interial addresses, is fully described in Section 6 of said copending application.

Referring to the three addressing examples at the right-hand side of FIG. 10, the addresses within each of the large capacity storage devices are illustrated as being divided into two blocks, one block being equal to the amount of high-speed storage on a system (in the given example) and the other block containing the remainder of the storage locations within the particular storage unit. Reference to the examples of FIG. 10 also illustrate that the two blocks of storage within a storage unit are transposed; that is to say, the addresses which might normally be at the low end of the storage unit are moved to the high end of the storage unit so that addressing begins within any storage device at the point where addressing leaves off in the high-speed storage devices in that particular configuration.

As an example, consider the 32K addressing example. Therein, a single high-speed storage unit (HSS 1A) contains system addresses 0 through 32K–1, and it utilizes these system addresses as internal addresses. Next in the addresing spectrum, S LCS A contains system addresses 32K through 128K which are converted to internal addresses of 32K to 128K–1 and, in the transposed block, 0 through 32K–1. Then S LCS B contains system addresses of 160K through 288K–1, which are converted to internal addresses of 32K through 128K–1 and 0 through 32K–1. Then S LCS C and S LCS D are connected as an interleaved pair whereby it takes both units to span the 256K addresses between 288K and 544K; the even addresses appear in S LCS C and odd addresses appear in S LCS D. However, these addresses are converted to internal addresses for use by the individual storage units such that each of these has internal addresses of 32K through 128K–1 and 0 through 32K–1, transposed as before. Thus, the 32K addressing example illustrates that each LCS has a starting address which is one address higher than the highest HSS address, and runs to the maximum address of the unit, followed by a transposed block of addresses which equal those in the high-speed storage. Thus, transposition, or wrap-around is provided on a unit-by-unit basis.

The 64K addressing example illustrates that where 64K locations of HSS is provided, a block of 0 through 64K–1 is transposed from the low end of the LCS to the high end of the LCS; note that it is immaterial whether a large or small LCS is involved, as illustrated by a similar transposed block of 0 through 64K–1 appearing in L LCS A as well as in S LCS C.

The 128K addressing example illustrates that when four HSS units are provided, blocks of 128K are transposed. Although not shown in the 128K addressing example, it should be clear by comparing the S LCSs in the other two examples with the addressing configuration in the 128K addressing example that any S LCS unit (which includes 128K storage locations) will be addressed, internally, as if there were no high-speed storage at all when there are four high-speed storage units provided because four units provide a total of 128K addresses; in other words, the four HSS units are equal to one S LCS unit as illustrated in the 128K addressing example.

The advantageous method of addressing in accordance with the present invention includes address decoding in several steps, the first of which is to decode the actual address provided to the BCU, which is referred to herein as a system address. These addresses are then decoded so as to specify one out of sixteen possible address groups (0–15) which are illustrated at the left of FIG. 10. Once the address group is decoded, it can be determined that a system address in the particular group, with the particular configuration of high-speed storage on the individual system, means that a particular storage group is to be reached, the storage groups relating to 128K locations within actual bulk storage devices (S LCS and L LCS). For illustration, in the 32K addressing example, if address group 2 were decoded by a combination of NOT 0, NOT 1, 2, NOT 3 (with any combination of bits 4 and 5) then either S LCS B or the combinatton of S LCS C and S LCS D must be reached, depending upon the configuration of bits 4 and 5. In other words, bits 4 and 5 will completely identify the amount of high-speed storage involved and therefore the amount of displacement which is required in the bulk storage as a result of high-speed storage in the given example.

The second step in address decoding is to take into account the amount of high-speed storage (as previously referred to) and examine bits 4 and 5 of the system address to determine, from the address group, which block of storage is being referred to. Note that each of the addressing examples has included thereon storage groups 0, 1, 2 . . . etc. Thus, the address groups (to the left in FIG. 10) are combined with bits 4 and 5 together with information relating to the amount of high-speed storage on a system, to point to a storage group; a storage group is defined to be a block of 128K storage locations (equal to one S LCS, or one-half of an L LCS). Thus, in the 32K example, address group 1 will yield storage group 1 except when both its bits 4 and 5 are ZEROs; when bits 4 and 5 are ZEROs, a high-speed storage shift results to shift from address group 1 to storage group 0. In the 64K addressing example, whenever storage bit 4 is a 0, then a shift from an address group to a lower storage group (such as from 1 to 0) will occur. In the 128K addressing example, the specification of any address group automatically results in reaching the next lower-ordered storage group (i.e., address group 2 always specifies storage group 1).

In the next level of decoding, once the storage group is known (based on the actual, system address, and on the amount of high-speed storage in a system), then a particular LCS is picked in dependence upon the configuration of LCSs which is provided in the given example. For instance, in the particular 64K addressing example shown in FIG. 10, storage group 0 or 1 will pick L LCS A, storage group 2 will pick S LCS C, storage group 3 will cause invalid address 3 to operate, and storage groups 4–7 will call for either L LCS E or L LCS F in dependence upon the odd or even nature (address bit 20 equalling ONE or ZERO, respectively) of the actual address, inasmuch as these two storage devices are operated in odd/even interleaved fashion.

The principles of addressing which have just been described with respect to FIG. 10 are alluded to in the configuration of FIG. 2, which is a simplified block diagram of the storage address decode circuits in accordance with one embodiment of the present invention. Therein, address groups are decoded, the amount of required high-speed storage shifting is decoded, and the interleaved selection is decoded in response to actual system addresses; from the address group and the high-speed shift decode, a storage group is decoded. The storage group which is decoded is then utilized together with circuit arrangements which reflect the definition of the S LCS/L LCS configuration within a system so as to select a particular LCS unit, or to generate an invalid address indication.

Referring to FIG. 3, a switch 20 within the high-speed storage shift decode circuit is set in accordance with the amount of high-speed storage in the system so as to provide an appropriate high-speed storage shift signal at the output of FIG. 3. The circuitry of FIG. 3 decodes address bits 4 and 5 to determine if the decoded address group is to be shifted so as to define the correct storage group. As illustrated with respect to FIG. 10, if 32K high-speed storage is provided, then an address group will define the next lower storage group only when the address bits 4 and 5 are both ZERO (NOT 4 and NOT 5). This is decoded by an AND circuit 22 in FIG. 3. If 64K of high-speed storage is provided, then anytime bit 4 is a 0 this will cause an address group to specify the next lower-ordered storage group, so that the 64K position of the switch 20 in FIG. 3 is connected directly to the NOT 4 bit. If 96K of high-speed storage is provided, then whenever NOT 4 appears, or even if there is a 4 whenever NOT 5 appears, a shift must take place. An AND circuit 24 in FIG. 3 recognizes when address bit 4 is a ONE and address bit 5 is a ZERO, and an OR circuit 26 recognizes when address bit NOT 4 is present (bit 4=ZERO), or the AND circuit 24 operates. Whenever 128K high-speed storage is provided, one entire storage group is utilized for high-speed storage, and therefore there always is a shift from an address group to the next lower-order storage group as provided by a positive signal applied directly to the 128K contact of the switch 20 in FIG. 3.

Figure 4:
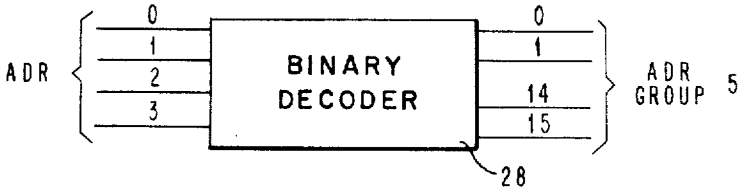
FIG. 4 is a simplified schematic block diagram of an address group decoder for use in the embodiment of FIG. 2.

Address groups are decoded in FIG. 4 by an ordinary binary decoder 28 which converts the highest-ordered four address bits (0–3) into a signal on a single one of sixteen address group lines (0–15). These output lines specify the address groups illustrated at the left-side of FIG. 10.

Figure 5:
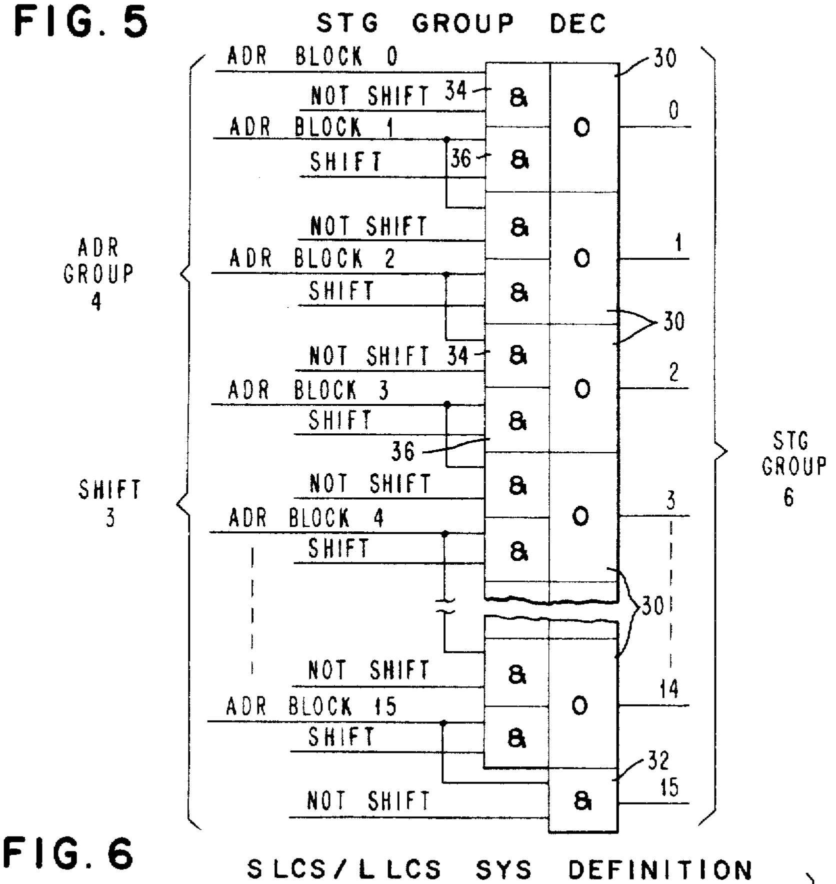
FIG. 5 is a simplified schematic block diagram of a bulk storage group decoder for use in the embodiment of FIG. 2.

The outputs of FIGS. 3 and 4 are applied to FIG. 5 so as to decode a particular storage grouping. In FIG. 5, a plurality of OR circuits 30, and an AND circuit 32 each provide an output signal relating to one of the sixteen possible storage groups (0–15). Each of the OR circuits 30 responds to a corresponding pair of AND circuits 34, 36 which operate in response to a signal indicating the corresponding address block without a shift, or to a signal relating to the next higher-address block with a shift, respectively. As an example, if address block 2 is specified with no shift, then a signal will be generated on storage group 2 line; however, if address block 2 is accompanied with a shift signal, then a signal will be generated on storage group 1 line. The highest ordered address block (15), when unaccompanied by a shift signal will cause the AND circuit 32 to specify storage group 15.

Figure 6:
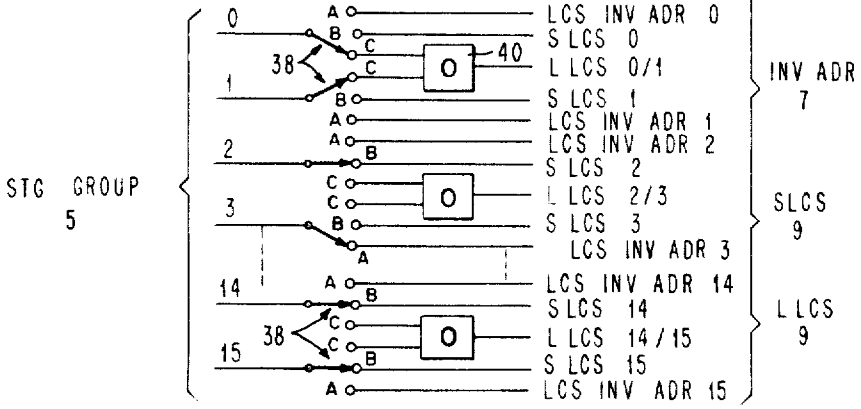
FIG. 6 is a simplified schematic block diagram of exemplary circuits for defining the configuration of large and small storage devices, in a system incorporating the present invention, for use in the embodiment of FIG. 2.

In FIG. 6 there are provided a plurality of selector switches 38 each of which has three contacts: A, B, C. In each case, the A contact relates to a gap in that storage group, the B contact relates to selection of a small LCS and the C contact relates to the selection of a large LCS, half of which is included within that storage group. Thus, as shown by the switches energized by signals on storage group lines 0 and 1, a large LCS (referred to in FIG. 6 as L LCS 0/1) will be designated by a signal generated by an OR circuit 40 in response to a signal on either the STG GROUP line 0 or the STG GROUP line 1. On the other hand, if storage group 2 is specified, it will call for small LCS 2; if storage group 3 is specified by the input addresses, then an invalid address will be specified due to the fact that a gap is provided in storage group 3. The setting shown in FIG. 6 (at least for the switches relating to storage group signal lines 0–3) actually illustrate the setting of the switch for the 64K addressing example shown in FIG. 10. Notice that the definition of a particular configuration of S LCS and L LCS in a system, by means of the switches in FIG. 6, handles the storage groups in pairs such that 0 and 1 may be grouped together to define an L LCS or they may be switched independently (as shown with respect to storage groups 2 and 3) so as to specify individual S LCS units or gaps which have the same size as an S LCS (and therefore the same size as a storage group). Any time a gap is specified, it will cause a corresponding LCS invalid address signal to be generated.

Figure 7:
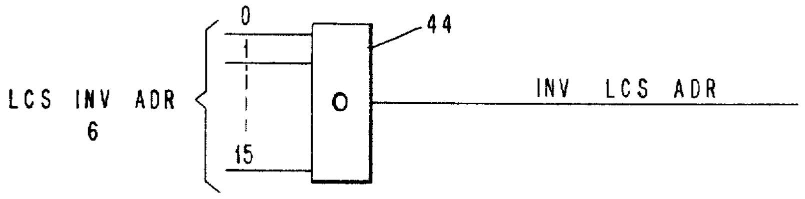
FIG. 7 is a simplified schematic block diagram of a detector for large capacity storage invalid addresses as shown in the embodiment of FIG. 2.

The invalid address signals generated in FIG. 6 are applied to an OR circuit 44 in FIG. 7, which generates an invalid LCS address signal (on an INV LCS ADR line) for use by the system in any way which may be convenient. This is exemplary merely, and the individual LCS invalid address signals might be combined with particular other signals in a system, rather than being grouped by the OR circuit as shown in FIG. 7. The output of FIG. 7 might be used, for instance, as an input to an OR circuit which otherwise causes the recognition of an invalid address, as set forth in Section 6 of said copending application.

Figure 8:
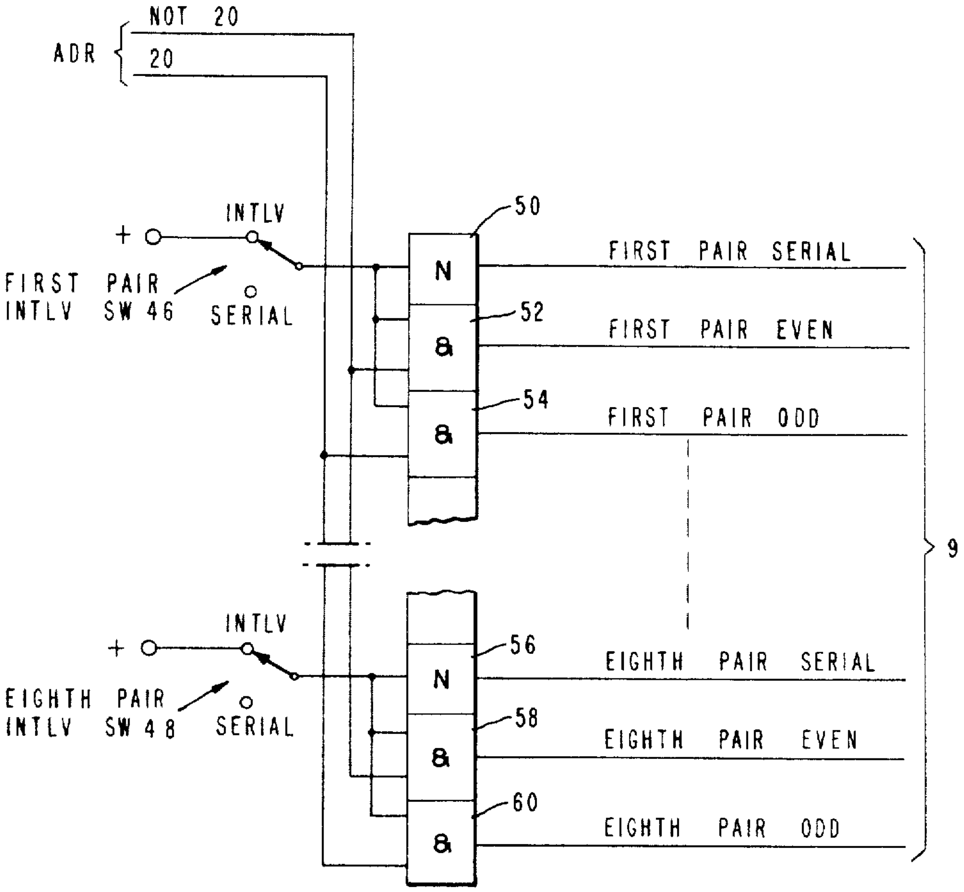
FIG. 8 is a schematic block diagram of an interleaved decoder for use in the embodiment of FIG. 2.

As illustrated in both the 32K example and the 64K example in FIG. 10, any properly related pair of bulk storage devices may be operated in odd/even interleaved fashion; on the other hand, they may be operated serially as shown with respect to S LCS A and S LCS B in the 32K example and with respect to all the LCSs in the 128K example shown in FIG. 10. Whether a pair is to be operated in an interleaved or serial fashion must be determined by the installers of the system, and this may be achieved by proper setting of switches 46 and 48 as shown in FIG. 8. Thus, if interleaving of the first pair of LCSs is to be utilized, a positive signal is applied to an inverter 50 and to two AND circuits 52, 54 as a result of setting a switch 46. Similarly, a switch 48 will apply a positive signal to an inverter 56 and a pair of AND circuits 58 and 60 when interleaving of the eighth pair of bulk storage devices on a system is required. Application of the positive interleaved signal by the switch 46 to the inverter 50 prevents the inverter 50 from generating a signal on a FIRST PAIR SERIAL line. It will however enable one of the AND circuits 52, 54 to generate a related signal on a corresponding line (FIRST PAIR EVEN, FIRST PAIR ODD), respectively, in respective dependence upon whether bit 20 in the incoming address is a ONE (ADR 20) or a ZERO (ADR NOT 20). On the other hand, if the switch 46 is set to the serial contact, there is no input to the inverter 50, so there will be a signal on the FIRST PAIR SERIAL line and both of the AND circuits 52, 54 will be blocked to prevent ODD and EVEN signal generation therein.

Figure 9:
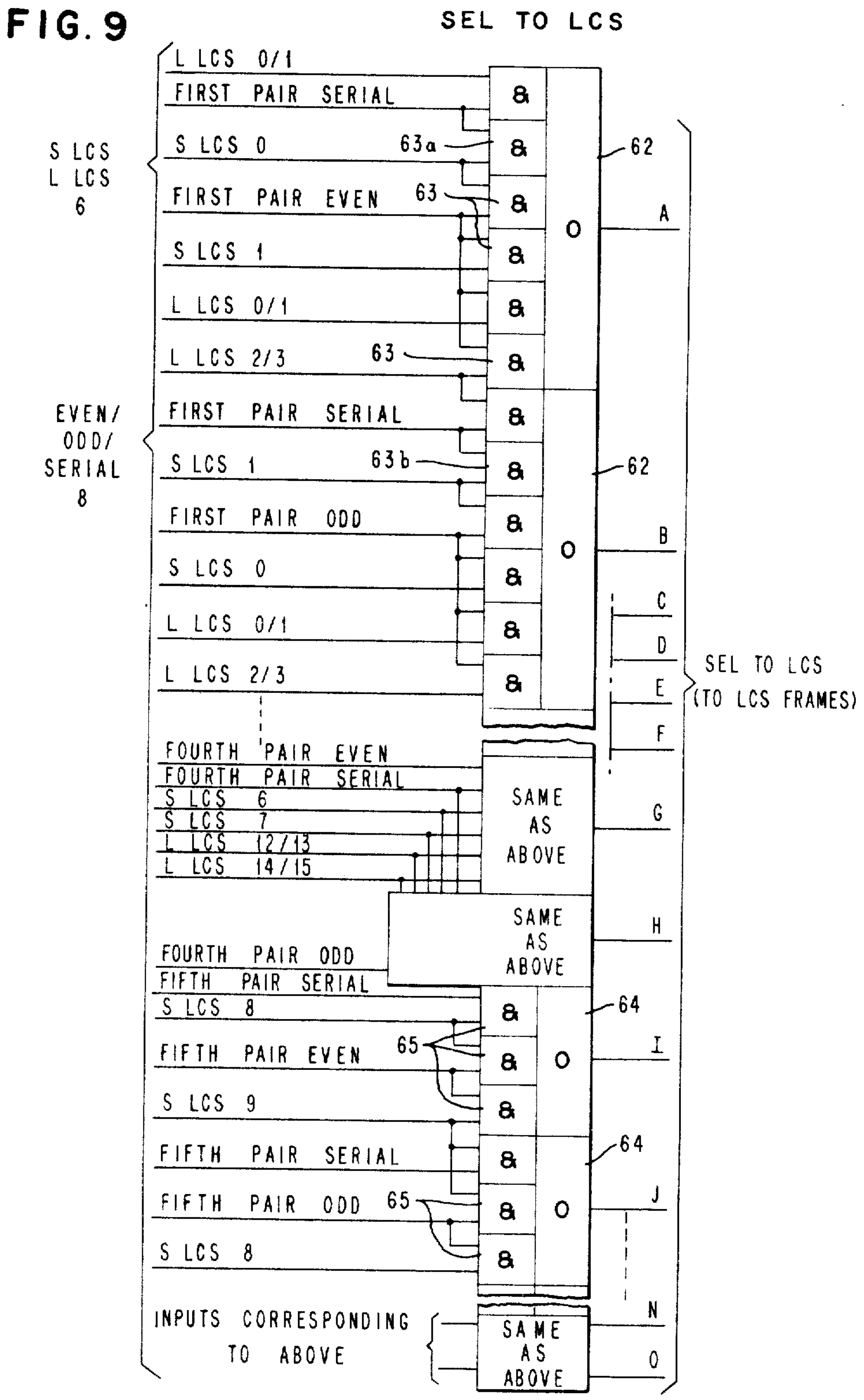
FIG. 9 is a schematic block diagram of large capacity storage selector circuits for use in the embodiment of FIG. 2.

Signals generated in FIG. 8 are applied, together with the LCS output signals from FIG. 6 so as to select a particular bulk storage unit by means of the circuitry in FIG. 9. In FIG. 9, a plurality of OR circuits 62, 64 are responsive to related groups of AND circuits 63, 65 so as to recognize conditions in the system as described with respect to FIG. 10 and to generate a signal indicating the particular storage unit, or frame, which has been selected. For illustration, the 32K addressing example of FIG. 10 will cause a FIRST PAIR SERIAL (because S LCS A and S LCS B are connected serially) signal at the input of FIG. 9. Then, whenever C LCS 0 is operated, an AND circuit 63*a* will cause the OR circuit 62 to select LCS unit A (by a signal on the SEL TO LCS A line) which is shown on FIG. 10 as S LCS A. With the FIRST PAIR SERIAL, whenever S LCS 1 is selected, then an AND circuit 63*b* will cause an OR circuit 62 to generate the SEL TO LCS B signal. Although broken away in FIG. 9 for purposes of simplicity, S LCS C or S LCS D will be reached in dependence upon the EVEN or ODD nature, respectively, of the input address, regardless of which address group is selected. Since these have been broken away from FIG. 9 for simplicity, consider, instead, a case where S LCS A and S LCS B are interleaved: if either S LCS 0 or S LCS 1 is reached, an EVEN signal will cause S LCS A to be selected; on the other hand, if the FIRST PAIR ODD signal is present, then either selection of S LCS 1 or S LCS 0 will cause LCS B to be selected.

Note that the bottom of FIG. 9 illustrates that eight pairs may be utilized only when all are S LCSs; thus, simpler circuits are involved.

Also not that the ODD and EVEN significance at he input of FIG. 9 is determined by bit 20 only, whereas the selection of particular LCSs is determined by the system configuration definition as in FIG. 6 together with the address group combined with the high-speed shift as in FIGS. 3, 4 and 5 so as to determine a particular storage group.

Thus, the circuits of FIGS. 3–9, which are shown collectively in the block diagram of FIG. 2, will perform selection in accordance with the principles described with respect to FIG. 10.

It should be obvious to those skilled in the art, however, that the switching arrangements shown herein might be substituted for by plug wired, by soldered-in wiring, or by other methods: similarly, only sufficient hardware so as to define a particular system configuration need be provided, and the various switches, and so forth, could be eliminated. For instance, if a 32K high-speed storage system were being outfitted with two small LCSs (which is equivalent to the first 288K of system addresses with respect to the 32K addressing example of FIG. 10), FIG. 3 would require only the AND circuit 22 to define a shift, the AND circuit 24, OR circuit 26 and switch 20 could be eliminated. In the same example, the binary decoder of FIG. 4 would still be utilized only if it was felt necessary to provide LCS invalid addresses by this means, rather than by recognizing the presence of bit 0, or bit 1 or bit 2 together with bit 3, etc., as invalid addresses (as in Section 6 of said copending application). On the other hand, the system definition shown in FIG. 6 could be achieved merely by utilizing the storage grouping lines shown in FIG. 5 directly as LCS selection lines: in other words, storage group 0 output line in FIG. 5 could be connected as a SELECT TO LCS A signal for S LCS A and storage group line 1 at the output of FIG. 5 could be connected directly to the other LCS as a SELECT TO LCS B signal for S LCS B; in other words, FIG. 6 may actually be eliminated by properly wiring the system whenever there is no interleaving. On the other hand, if a 32K highspeed storage and only two S LCSs were to be utilized, but these were to be interleaved, the outputs of FIG. 5 on storage group lines 0 and 1 could be utilized directly to energize AND circuits 52 and 54 so that anything other than an invalid address will permit EVEN and ODD selecting in response to bit 20 of the input address.

The foregoing paragraph is illustrative merely of the fact that the invention has been disclosed and described with respect to a somewhat universal connection capability for the purposes of teaching the nature of the invention, and should in no way be taken as a limiting factor in the usefulness of the invention in simplified wire-in circuits.

Utilization of the address bits to internally address the different storage devices once they are selected is achieved as set forth in FIGS. 12 and 13 which respectively relate to small and large LCS units. As shown at the lower left of FIG. 10, input address bits 0–3 are utilized to define an address group whereas input address bits 4 and 5 are utilized to specify a high-speed storage shift in accordance with the amount of high-speed storage on the system. Together, address bits 0–5 select a particular LCS unit. Address bits 6–19 are used only as internal address bits within the storage devices themselves. In addition, address bits 2 and 3 may be utilized as internal addresses, and address bits 4 and 5 are utilized as internal addresses in all cases (as well as specifying shift amounts). Some the L LCS units are twice as large as the S LCS units, the L LCS units require an additional address bit for internal addressing than do the S LCS units. The L LCS address bits will be bit 2 through 19 if interleaving is being utilized, bit 20 determining which of the interleaved pair of L LCS units are selected; on the other hand, if L LCS pairs are connected serially, then bit 20 is not utilized to determine which of the two units is involved, but is used instead as an internal address; in this case, bit 2 is not required as an internal address, but is utilized to pick one of the pair of serially-connected units. Therefore, the circuit of FIG. 13 throws away bits 0 and 1 at the input to the particular storage unit since these are not required for internally addressing the unit, but rather are used only to pick a particular one of the units. If an L LCS is being used in a serial fashion, its addresses will be applied as shown by the switch position illustrated in FIG. 13; if a particular LCS is one of an interleaved pair, then the switch would be moved to the other position so that bit 18 of the actual internal address (applied to the MAR thereof) would be fed from bit 19 of the input address instead of from bit 20 thereof. Similarly, FIG. 12 illustrates the fact that a small LCS may be connected in a serial fashion, utilizing bits 3–20 as internal addresses, and not utilizing bit 0 or 2 in any case, nor using bit 3 for any purpose when operating in a serial mode.

However, if an S LCS were to be operated in an interleaved fashion (with the switch as shown in FIG. 12), then bit 3 is required as an internal address since bit 20 is used to pick one of the pair of S LCSs being operated in an EVEN/ODD interleaved fashion.

Although the invention has been shown and described with respect to particular embodiments thereof, it should be understood by those skilled in the art that the foregoing and other changes in the form and detail thereof may be made therein without departing from the spirit and scope of the invention, which is to be limited only as set forth in the following claims.

What is claimed is:

1. In a storage addressing apparatus, the combination comprising:
means responsive to manifestations of addresses to generate first signals, the significance of which is to divide said addresses into a first plurality of groups;
means for defining a shift amount in response to certain ones of said address manifestations;
means responsive to said last two means to generate second signals, the significance of which is to divide addresses into a second plurality of groups;
and means responsive to said second signals to select one of a plurality of storage units.

2. The device described in claim 1 including means to utilize at least one of said second plurality of signals to indicate an invalid address.

3. In a data processing system including one or more storage units where each storage unit is individually selectable and where system storage locations are identified by configurations of address bit manifestations, addressing apparatus, comprising:
means responsive to high-order address bit manifestations to specify one of a first plurality of address groups, said means generating a corresponding address group signal to identify any selected one of said plurality of address groups;
means responsive to address bit manifestations which are lower-ordered than said high-order address bit manifestations for generating a shift signal, said signal being generated in response to a selected configuration of said lower-ordered address bit manifestations;
means responsive to said address group signal and to said shift signal for generating a particular one of a second plurality of possible storage group signals, each storage group signal specifying a related group of storage locations;
means responsive to said storage group signal for generating a selected one of a plurality of storage selection signals, each storage selection signal specifying a particular related storage unit;
and means responsive to certain of said address bit manifestations for addressing storage locations within a storage unit selected by said storage selection signal, said address bit manifestations being unshifted as applied to said selected storage unit as an internal address therefor.

4. The device described in claim 3 including means to utilize at least one of said second plurality of signals to indicate an invalid address.

5. In a data processing system having a variable amount of fast, high-speed storage, and being connectable in varying configurations with different amounts of various sized bulk storage devices, addressing apparatus, comprising:
means to define address groups which relate to an elemental size of bulk storage;
and means dependent upon the amount of high-speed storage in said system and responsive to particular address manifestations applied thereto for shifting the basic groupings to secondary groupings, and to thereby specify particular bulk storage units.

6. The method of contiguously addressing an array of system storage devices, said array including at least one primary storage device, a plurality of bulk storage devices and addressing means for accessing said storage devices, which comprises:

utilizing a first range of lowest-ordered system addresses for accessing with said addressing means corresponding locations in said primary storage, utilizing a second range of addresses which are contiguous with said first range for accessing with said addressing means low-order locations in a first one of said bulk storage devices, said low-order locations including the total number of locations in said first bulk storage device minus the number of locations in said primary storage, utilizing a third range of addresses which are contiguous with said second range of addresses and equal in addressing capacity to said first range of addresses to access with said addressing means correspondingly related high-order locations of said first bulk storage device, utilizing a fourth range of addresses which are contiguous with said third range of addresses for accessing with said addressing means related low-order locations in a second one of said bulk storage devices, said related low-order locations including the total number of locations in said second bulk storage device minus the number of locations in said primary storage, and utilizing a fifth range of addresses which are contiguous with said fourth range of addresses and equal in addressing capacity to said first range of addresses for accessing with said addressing means correspondingly related high-order locations of said second bulk storage device.

7. The invention of claim 1 wherein said storage units are of various sizes.

8. The invention of claim 3 wherein said storage units are of various sizes.

9. The invention of claim 5 wherein said bulk storages are of various sizes.

10. The invention of claim 6 wherein said bulk storages are of various sizes.

11. In a data processing apparatus including a first data processing system having one or more first storage units and including a second data processing unit associated with one or more second storage units where all or some of said second storage units are different than or the same as said first storage units; a storage addressing apparatus common to said first and second data processing systems for contiguously addressing said first and second storage units comprising:

first means responsive to manifestations of addresses to generate first signals, the significance of which is to divide said addresses into a first plurality of groups;

shift means for defining a shift amount in response to certain ones of said address manifestations;

means responsive to said first and shift means to generate second signals, the significance of which is to divide addresses into a second plurality of groups;

and means responsive to said second signals to select one of said storage units.

12. An apparatus for contiguously addressing an array of storage devices that includes at least one primary storage device and a plurality of bulk storage devices, which comprises:

means utilizing a first range of lowest-ordered system addresses for utilizing corresponding locations in said primary storage, means utilizing a second range of addresses which are contiguous with said first range for utilizing low-order locations in a first one of said bulk storage devices, said low-order locations including the total number of locations in said first bulk storage device minus the number of locations in said primary storage, means utilizing a third range of addresses which are contiguous with said second range of addresses and equal in addressing capacity to said first range of addresses utilizing correspondingly related high-order locations of said first bulk storage device, means utilizing a fourth range of addresses which are contiguous with said third range of addresses utilizing related low-order locations in a second one of said bulk storage devices, said related low-order locations including the total number of locations in said second bulk storage device minus the number of locations in said primary storage, and means utilizing a fifth range of addresses which are contiguous with said fourth range of addresses and equal in addressing capacity to said first range of addresses for utilizing correspondingly related high-order locations of said second bulk storage device.

References Cited

UNITED STATES PATENTS

| | | | |
|---|---|---|---|
| Re. 26,087 | 9/1966 | Dunwell et al. | 340—172.5 |
| 3,323,109 | 5/1967 | Hecht et al. | 340—172.5 |
| 3,319,226 | 5/1967 | Mott et al. | 340—172.5 |
| 3,292,151 | 12/1966 | Barnes et al. | 340—172.5 |
| 3,290,658 | 12/1966 | Callahan et al. | 340—172.5 |
| 3,248,709 | 4/1966 | Betz | 340—172.5 |
| 3,248,702 | 4/1966 | Kilburn et al. | 340—172.5 |
| 3,202,970 | 8/1965 | Rice | 340—172.5 |
| 3,201,761 | 8/1965 | Schmitt et al. | 340—172.5 |

GARETH D. SHAW, *Primary Examiner.*